US010624362B2

(12) United States Patent
Fielding et al.

(10) Patent No.: US 10,624,362 B2
(45) Date of Patent: Apr. 21, 2020

(54) EDIBLE PRINT SUBSTRATES AND METHODS OF MAKING AND USING THE SAME

(71) Applicant: CULPITT II, LLC, Anoka, MN (US)

(72) Inventors: Mimi Fielding, Gig Harbor, WA (US); Megan Leifson, Tacoma, WA (US)

(73) Assignee: THE LUCKS COMPANY, LLC, Anoka, MN (US)

( * ) Notice: Subject to any disclaimer, the term of this patent is extended or adjusted under 35 U.S.C. 154(b) by 430 days.

(21) Appl. No.: 14/990,672

(22) Filed: Jan. 7, 2016

(65) Prior Publication Data

US 2016/0192673 A1    Jul. 7, 2016

Related U.S. Application Data

(60) Provisional application No. 62/100,767, filed on Jan. 7, 2015.

(51) Int. Cl.
*A23G 3/34* (2006.01)
*A23G 3/42* (2006.01)
*A23G 3/36* (2006.01)

(52) U.S. Cl.
CPC .............. *A23G 3/343* (2013.01); *A23G 3/36* (2013.01); *A23G 3/42* (2013.01); *A23V 2002/00* (2013.01)

(58) Field of Classification Search
CPC ............ A23G 3/343; A23G 3/36; A23G 3/42
USPC ...................................................... 426/103
See application file for complete search history.

(56) References Cited

U.S. PATENT DOCUMENTS

| | | |
|---|---|---|
| 615,191 A | 11/1898 | Lembke |
| 919,736 A | 4/1909 | Loesch |
| 1,605,903 A | 11/1926 | Schuler |
| 1,781,209 A | 11/1930 | Barbera |
| 2,123,215 A | 7/1938 | Thomas |
| 2,347,022 A | 4/1944 | Austin |
| 2,353,594 A | 7/1944 | Seagreen |
| 2,394,322 A | 2/1946 | McKee |
| 2,526,811 A | 10/1950 | Dawson |
| 2,578,150 A | 12/1951 | Rathke |
| 2,610,588 A | 9/1952 | Seagren et al. |
| 2,895,832 A | 7/1959 | Bersey |
| 2,911,304 A | 11/1959 | Wenger |
| 3,057,730 A | 10/1962 | Morck |
| 3,192,086 A | 6/1965 | Warren |
| 3,198,109 A | 8/1965 | Dwyer et al. |
| 3,503,345 A | 3/1970 | Abrams |
| 3,658,977 A | 4/1972 | Baker |
| 3,699,879 A | 10/1972 | Ritzer |
| 3,776,185 A | 12/1973 | Kawasaki |
| 3,852,494 A | 12/1974 | Williamson |
| 4,024,287 A | 5/1977 | Golchert et al. |
| 4,061,783 A | 12/1977 | Hoffman et al. |
| 4,168,662 A | 9/1979 | Fell |
| 4,278,022 A | 7/1981 | Fitzpatrick et al. |
| 4,285,978 A | 8/1981 | Quinlivan et al. |
| 4,369,200 A | 1/1983 | Iwao et al. |
| 4,388,862 A | 6/1983 | Thomas et al. |
| 4,409,893 A | 10/1983 | Newman et al. |
| 4,466,994 A | 8/1984 | Hubbard et al. |
| 4,531,292 A | 7/1985 | Pasternak |
| 4,548,825 A | 10/1985 | Voss et al. |
| 4,560,562 A | 12/1985 | Schroeder |
| 4,578,273 A | 3/1986 | Krubert |
| 4,592,916 A | 6/1986 | Akesson |
| 4,668,521 A | 5/1987 | Newsteder |
| 4,668,523 A | 5/1987 | Begleiter |
| 4,778,683 A | 10/1988 | Newsteder |
| 4,915,971 A | 4/1990 | Fennema et al. |
| 4,946,696 A | 8/1990 | Nendl et al. |
| 5,017,394 A | 5/1991 | MacPherson et al. |
| 5,035,907 A | 7/1991 | Phillips et al. |
| 6,030,134 A | 2/2000 | Stewart |
| 6,210,731 B1 | 4/2001 | Brissonneau |
| 6,472,006 B1* | 10/2002 | Loh .................. A23C 19/16 106/219 |
| 6,893,671 B2 | 5/2005 | Ben-Yoseph et al. |
| 7,226,630 B2 | 6/2007 | Loh |
| 2003/0054039 A1* | 3/2003 | Zyck .................. A61K 8/19 424/488 |
| 2004/0043134 A1 | 3/2004 | Corriveau et al. |
| 2004/0131740 A1 | 7/2004 | Woodhouse et al. |

(Continued)

FOREIGN PATENT DOCUMENTS

| | | |
|---|---|---|
| CH | 298862 | 9/1954 |
| EP | 1021094 A2 | 7/2000 |

(Continued)

OTHER PUBLICATIONS

Non-Final Office Action in U.S. Appl. No. 09/550,951 dated Oct. 12, 2001.
PCT/US2016/012525, International Search Report and Written Opinion, dated Mar. 16, 2016, 14 pages.
Mixing Technology, 2011 TetraPak (year 2011).
My Delicious Cakes, Mar. 14, 2016, http:web.archive.org.web/201603142329037/http://www.mydeliciouscakes.com.au/instructions-for-edible-images (year 2016).
TetraPak High Shear Mixer, Sep. 10, 2015, http://web.archive.org/web/20150910215420/https://www.tetrapak.com/processing/mixing/tetra-pak-high-shear-mixer (year 2015).
Igoe, et al., Dictionary of Food Ingredients, Fifth Edition, 2011 p. 27, 32, 91 (year 2011).

(Continued)

*Primary Examiner* — Jyoti Chawla
(74) *Attorney, Agent, or Firm* — Gardella Grace P.A.

(57) ABSTRACT

The embodiments disclosed herein relate to edible print substrates. The edible print substrates can include one or more starches, celluloses, dextrins, sugars, humectants or plasticizers, or emulsifiers, or combinations thereof. In certain instances, the edible print substrates include maltodextrin having a DE of between about 5 and about 20. The edible print substrates can also include glycerine. The edible print substrates can be formed into single layer and multi-layer constructions.

14 Claims, 3 Drawing Sheets

(56) References Cited

U.S. PATENT DOCUMENTS

| | | |
|---|---|---|
| 2005/0106289 A1 | 5/2005 | Hoy |
| 2005/0129814 A1 | 6/2005 | Weibel |
| 2005/0233048 A1* | 10/2005 | Kitamura .................. C08L 3/02 426/578 |
| 2006/0038866 A1* | 2/2006 | Wen ........................ B41J 3/407 347/100 |
| 2006/0210681 A1 | 9/2006 | Churnick |
| 2006/0251775 A1 | 11/2006 | Anderson et al. |
| 2006/0275529 A1 | 12/2006 | Woodhouse et al. |
| 2007/0116824 A1* | 5/2007 | Prakash ................ A23L 1/2364 426/548 |
| 2008/0305219 A1 | 12/2008 | Stewart |
| 2013/0309369 A1* | 11/2013 | Hershberg ........... A23G 3/0097 426/103 |
| 2018/0228202 A1 | 8/2018 | Leifson et al. |

FOREIGN PATENT DOCUMENTS

| | | | |
|---|---|---|---|
| FR | 1158279 | A | 6/1958 |
| FR | 2453030 | A3 | 10/1980 |
| GB | 161740 | A | 4/1921 |
| GB | 196885 | A | 3/1924 |
| GB | 422430 | A | 1/1935 |
| GB | 543427 | A | 2/1942 |
| GB | 628886 | A | 9/1949 |
| GB | 786428 | A | 11/1957 |
| JP | 5807605 | A * | 5/1983 |
| JP | 5876054 | A | 5/1983 |
| JP | 5911136 | | 1/1984 |
| JP | 59118049 | A | 7/1984 |
| JP | 59183645 | | 10/1984 |
| JP | 60126057 | A | 7/1985 |
| JP | 60126058 | A | 7/1985 |
| JP | 62138279 | A | 6/1987 |
| JP | 06113788 | A | 4/1994 |
| JP | 10215792 | A | 8/1998 |
| WO | 199501735 | A1 | 1/1995 |
| WO | 1997049291 | A1 | 12/1997 |
| WO | 1998035568 | A3 | 8/1998 |

OTHER PUBLICATIONS

Leifson, et al., Office Action dated Nov. 30, 2018 for U.S. Appl. No. 15/898,051.

* cited by examiner

EDIBLE PRINT SUBSTRATES AND METHODS OF MAKING AND USING THE SAME

RELATED APPLICATIONS

This application claims priority to U.S. Provisional Application No. 62/100,767, filed on Jan. 7, 2015, titled EDIBLE PRINT SUBSTRATES AND METHODS OF MAKING AND USING THE SAME, which is hereby incorporated by reference in its entirety.

TECHNICAL FIELD

The present disclosure relates generally to edible print substrates. In certain embodiments, the edible print substrates can be printed upon and disposed on a foodstuff such as a cookie or a cake. Methods of making and using edible print substrates are also disclosed herein.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
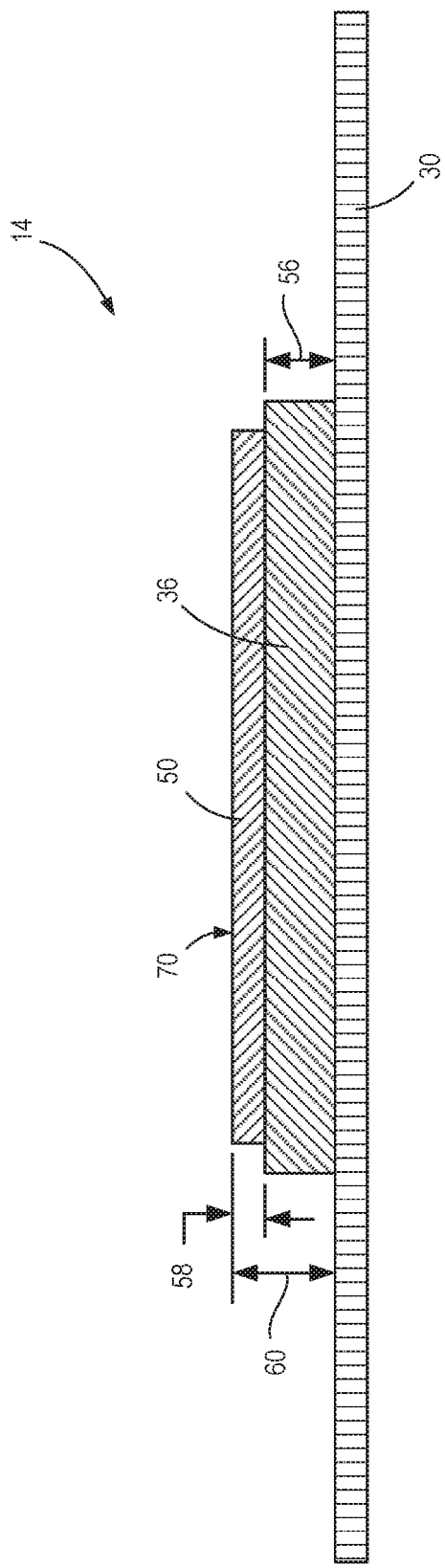
FIG. 1 is a cross-sectional view of an edible print substrate, according to one embodiment of the present disclosure.

The various embodiments disclosed herein relate to edible print substrates and methods of making and using the same. As detailed below, the edible print substrates can include, or otherwise be formulated from, one or more starches, celluloses, dextrins, sugars, humectants or plasticizers, or emulsifiers, or combinations thereof. After forming and/or shaping the formulation into the one or more edible print substrates, an edible-ink printing system, such as a thermal ink-jet printer, piezo-electric printer, or other computer-controlled printing device, can be used to print an image onto the edible print substrates, allowing custom images and decorations to be prepared at a bakery on an as-needed basis. The edible print substrates can then be disposed on a variety of different foodstuffs, including but not limited to, cookies, cakes, cupcakes, brownies, pies, and other pastries.

As used herein, the term "image" shall mean any graphic, textual, or other decorative matter, without limitation, including writing and photographs, that may be applied to the edible print substrate. The term "printing" and "printing method" shall mean any method of applying an image to the edible print substrates, including, without limitation, screen printing, thermal ink-jet printing, piezo-electric printing, offset printing, lithography, laser printing, electrostatic printing, xerographic printing, holography, pad printing, thermal transfer, air brushing, and manual decoration techniques. These printing techniques are well-known and could easily be used to print images on the edible print substrates by someone skilled in the various printing arts. For example, U.S. Pat. No. 4,668,523 to Begleiter describes methods for forming holograms in edible substances.

In some embodiments, the edible print substrates are formulated such that the image(s) disposed or printed thereon is substantially stable. A stable or substantially stable image can refer to an image that does not substantially change (e.g., bleed, fade, etc.) over time, or an image in which the change is minimal. For example, the image(s) can remain substantially constant or unchanged (or otherwise minimally changed) over time, e.g., when stored at room temperatures (e.g., between about 64° F. and about 78° F.) or when subjected to temperatures above or below room temperatures, such as refrigerator temperatures when placed in a refrigerator (e.g., between about 32° F. and about 40° F.) or freezer temperatures when placed in a freezer (e.g., between about −10° F. and about 2° F.).

In further embodiments, the edible print substrates are formulated such that the image(s) disposed or printed thereon is substantially unaffected (or otherwise minimally affected) by moisture (e.g., water and/or liquids) and/or oils in or on the foodstuff. In other words, the edible print substrates can be formulated such that moisture and/or oils from the foodstuff does not substantially flow or migrate through the edible print substrate to affect the image(s) disposed or printed thereon. For example, the edible print substrates (or a layer thereof) can be formulated to retard or prevent migration of moisture and/or oils through the edible print substrate (or a layer thereof), which can result in a protected or more stable image.

As further detailed below, the edible print substrates can be formed into single layer constructions or multi-layer constructions. Further, in some embodiments, the edible print substrates can be formed into multi-layer constructions having two or more different layers, each of which can be formulated to provide desired, and in some instances different, properties to the edible print substrate. For example, one or more layers can be formulated to provide barrier properties or protection against the flow or migration of moisture and/or oils from the foodstuff. One or more layers can also be formulated for increased image printability and/or stability. For example, one or more layers can be formulated with a desired or controlled pH, which can be advantageous in stabilizing the image(s) disposed or printed on the edible print substrate.

The edible print substrates disclosed herein can include, or otherwise be formulated from, various components or ingredients, each of which can impart one or more properties and/or characteristics to the edible print substrates. In some embodiments, for example, the formulation of the edible print substrates includes one or more starches, celluloses, dextrins, sugars, humectants or plasticizers, or emulsifiers, or combinations thereof. Additional components (e.g., gums, water, additives, etc.) can also be included in the formulation as desired. Further, in particular embodiments, the formulation includes only limited amounts of corn syrup or corn syrup solids. And in yet other embodiments, the formulation is devoid of corn syrup or corn syrup solids.

It will be appreciated that the amounts of the ingredients or components disclosed herein can refer to the amounts that are used to make a single layer construction, or the amounts that are used to make a layer of a multi-layer construction. For example, a formulation comprising between about 10% and about 24% by weight of maltodextrin can refer to a formulation that is used to form a single layer construction (which would comprise between about 10% and about 24% by weight of maltodextrin), or a formulation that is used to form a single layer of a multi-layer construction (in which instance the layer would comprise between about 10% and about 24% by weight of maltodextrin). The layers of a multi-layer construction can also contain different amounts of the ingredients or components, and each layer need not contain every ingredient or component identified herein. Single layer constructions also need not contain every ingredient or component identified herein.

In certain embodiments, the formulation includes one or more starches. Starches can serve as the base or structure forming material of the formulation. Starches can also be used as fillers or thickening materials to modify the viscosity of the formulation. For example, the type and/or amount of starches can impact the texture and/or moisture content of the formulation. Exemplary starches include, but are not limited to, tapioca starch, corn starch, wheat starch, rice starch, potato starch, and derivatives and/or combinations thereof. The starches can also be refined or unrefined, modified or unmodified, as desired. For example, in certain embodiments, modified corn starch can be used. In some embodiments, the formulation comprises between about 15% and about 40%, or between about 20% and about 35%, by weight of the one or more starches. In further embodiments, the formulation includes a combination of two or more starches. For example, the formulation can include between about 18% and about 34% by weight of a first starch such as tapioca starch, and between about 0% and about 5% by weight of a second starch such as corn starch (e.g., modified corn starch). In another embodiment, the formulation can include between about 22% and about 30% by weight of a first starch such as tapioca starch, and between about 0% and about 4%, or between about 0% and about 2%, by weight of a second starch such as corn starch (e.g., modified corn starch). Other combinations and/or amounts of starches can also be included in the formulation.

In some embodiments, the formulation includes one or more celluloses. Celluloses can provide toughness to the formulation, and enable the formulation to flex and/or bend without cracking. In some embodiments, the celluloses used are celluloses other than basic cellulose, such as microcrystalline cellulose, carboxymethyl cellulose (or cellulose gum), methyl cellulose, hydroxypropyl methyl cellulose, and derivatives and/or combinations thereof. Use of such celluloses can result in an observable improvement in the amount of fading and/or bleeding (e.g., decreased fading and/or decreased bleeding) of the images disposed on the edible print substrates. In some embodiments, the formulation comprises between about 3% and about 20%, or between about 5% and about 15%, by weight of the one or more celluloses. In certain embodiments, the formulation includes a combination of two or more celluloses. For example, the formulation can include between about 3% and about 10% by weight of a first cellulose such as microcrystalline cellulose, and between about 2% and about 8% by weight of a second cellulose such as carboxymethyl cellulose (or cellulose gum). In another embodiment, the formulation can include between about 4% and about 8% by weight of a first cellulose such as microcrystalline cellulose, and between about 2% and about 6%, or between about 3% and about 5% by weight of a second cellulose such as carboxymethyl cellulose (or cellulose gum). Other combinations and/or amounts of celluloses can also be included in the formulation. Other polysaccharide compounds can also be used in addition to or in place of the one or more celluloses. Additionally, one or more forms of algae such as seaweed can be used in addition to or in place of the one or more celluloses.

In some embodiments, the formulation includes one or more dextrins. Exemplary dextrins include, but are not limited to maltodextrins and derivatives thereof. In certain embodiments, maltodextrins having a particular dextrose equivalent (DE) are included in the formulation. As can be appreciated, dextrose equivalent (DE) is a measure of the amount of reducing sugars present in the maltodextrins, relative to dextrose (glucose), expressed as a percentage of the dry substance weight. In certain embodiments, the formulation includes one or more maltodextrins having a DE of between about 5 and about 20. In other embodiments, the formulation includes one or more maltodextrins having a DE of between about 5 and about 15. In still further embodiments, the formulation includes one or more maltodextrins having a DE of between about 8 and about 12. And in yet another embodiment, the formulation includes one or more maltodextrins having a DE of about 5, about 10, or about 15.

A particular amount of maltodextrins can also be included in the formulation. For example, in certain embodiments, the formulation includes between about 10% and about 24% by weight of maltodextrins. In other embodiments, the formulation includes between about 14% and about 20% by weight of maltodextrins. In yet further embodiments, the formulation includes between about 15% and about 18% by weight of maltodextrins. Other amounts of maltodextrins can also be used.

Further, in certain embodiments, use of maltodextrins can have a positive and/or beneficial effect on the fading and/or bleeding of images disposed on the edible print substrates. For example, use of maltodextrins instead of corn syrup (or corn syrup solids) can result in an observable improvement in the amount of fading and/or bleeding (e.g., decreased fading and/or decreased bleeding) of the images disposed on the edible print substrates.

In certain embodiments, the formulation includes a combination of one or more starches, one or more celluloses, and one or more dextrins. For example, in a particular embodiment, the formulation includes tapioca starch, modified corn starch, microcrystalline cellulose, carboxymethyl cellulose, and maltodextrin. Other combinations of starches, celluloses, and dextrins can also be included in the formulation as desired.

In further embodiments, one or more gums can be included in the formulation. Exemplary gums include, but are not limited to, acacia gum (or arabic gum), xanthan gum, and derivatives and/or combinations thereof. In certain embodiments, however, the formulation is devoid of gums such as acacia gum or xanthan gum.

As previously discussed, the formulation can also include one or more sugars. In certain embodiments, for example, sugars are used to sweeten the formulation. Sugars can also impart strength and elasticity to the formulation. Exemplary sugars include, but are not limited to, sucrose, dextrose, fructose, invert sugars (or inverted sugars), and derivatives and/or combinations thereof. Other known sugars can also be used. In certain embodiments, the formulation includes between about 3% and about 10% by weight of sugars. In other embodiments, the formulation includes between about 4% and about 8% by weight of sugars. As detailed below, one or more sweeteners can also be included to sweeten the formulation in addition to or in place of the one or more sugars.

The formulation can also include one or more humectants or plasticizers. In some embodiments, humectants or plasticizers are used to help maintain a proper water content within the formulation, e.g., so that the formulation is less susceptible to cracking and/or crumbling. Humectants or plasticizers can also be used to impart flexibility and/or a peeling functionality to the formulation. As further detailed below, for example, the formulation can be formed and/or shaped into edible print substrates, which can be disposed on a carrier. After being printed upon, the edible print substrates can be peeled from the carrier and disposed on a foodstuff. In such embodiments, one or more humectants or plasticizers can be used to impart flexibility and peelability such that the edible print substrates maintain their shape and/or structure while being peeled from the carrier. Exemplary humectants or plasticizers include, but are not limited to, polyhydric alcohols, glycerine (or glycerin), polyethylene glycol, monoglycerides (or fatty monoglycerides, or monoglycerides of fatty acids), and derivatives and/or combinations thereof. Other humectants or plasticizers can also be used.

In a particular embodiment, the formulation includes glycerine. Further, a particular amount of glycerine (and/or other humectants or plasticizers) can be included in the formulation. For example, in some embodiments, the formulation comprises between about 2% and about 17%, or between about 5% and about 17%, by weight of humectants or plasticizers such as glycerine. In other embodiments, the formulation comprises between about 5% and about 15% by weight of humectants or plasticizers such as glycerine. In yet other embodiments, the formulation comprises between about 8% and about 12% by weight of humectants or plasticizers such as glycerine. In still other embodiments, the formulation comprises between about 2% and about 8%, or between about 2% and about 6%, by weight of humectants or plasticizers such as glycerine. Other amounts of glycerine (and/or other humectants or plasticizers) can also be used.

One or more emulsifiers can also be included in the formulation. For example, in certain embodiments, one or more emulsifiers can aid in maintaining homogeneity in the formulation. Emulsifiers can also improve the flow of the formulation in liquid form during processing and act as release agents to reduce clinging to a carrier such as a backing sheet. Exemplary emulsifiers include, but are not limited to, polyglycerol esters of fatty acids, polysorbate (e.g., polysorbate 60, polysorbate 80, etc.), lecithin, mono and/or diglycerides (or mono and/or diglycerides of fatty acids), and derivatives and/or combinations thereof. In certain embodiments, for example, the formulation includes between about 0.3% and about 1.0% by weight of an emulsifier such as polyglycerol esters of fatty acids. In another embodiment, the formulation includes between about 0.4% and about 0.8% by weight of an emulsifier such as polyglycerol esters of fatty acids.

In some embodiments, one or more lipids or triglycerides (or triglycerides of fatty acids) having a low melting point can be included in the formulation. Low melting point triglycerides can include natural, fully or partially hydrogenated, and/or fractionated edible vegetable and/or animal fats and oils having a melting point of 95° F. or lower. Exemplary low melting point triglycerides include, but are not limited to, coconut oil, rapeseed oil, soybean oil, palm oil, shortening, palm oil shortening, palm kernel oil, sunflower oil, corn oil, canola oil, cottonseed oil, peanut oil, cocoa butter, anhydrous milkfat, lard, beef fat, and derivatives and/or combinations thereof. In certain embodiments, for example, the formulation comprises between about 10% and about 30%, or between about 15% and about 25%, by weight of low melting point triglycerides. In further embodiments, the formulation includes a combination of two or more low melting point triglycerides. For example, the formulation can include between about 5% and about 15% by weight of a first low melting point triglyceride such as a shortening or palm oil shortening, and between about 5% and about 15% by weight of a second low melting point triglyceride such as coconut oil. In another embodiment, the formulation includes between about 7% and about 12%, or between about 5% and about 10%, by weight of a first low melting point triglyceride such as a shortening or palm oil shortening, and between about 7% and about 12%, or between about 5% and about 10%, by weight of a second low melting point triglyceride such as coconut oil. Other amounts of low melting point triglycerides can also be used.

In certain embodiments, one or more high melting point lipids can also be mixed with the low melting point triglycerides or otherwise included in the formulation. High melting point lipids can include long chain fatty acids, their monoglycerides, diglycerides, and triglycerides, alkaline metal salts, and other derivatives thereof having a melting point of 158° F. or higher. In some embodiments, the high melting point lipids comprise long chain fatty acids, e.g., having between about 16 and about 24 carbon atoms. The long chain fatty acids can also be saturated. Exemplary high melting point lipids include, but are not limited to, palmitic, stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids, and derivatives and/or combinations thereof. In some of such embodiments, the formulation includes between about 1% and about 8%, or between about 2% and about 6%, by weight of a high melting point lipid such as calcium stearate.

In particular embodiments, the low meting point lipids or triglycerides can be mixed or blended with the high melting point lipids. For example, in one embodiment, the one or more low melting point lipids or triglycerides can be melted and mixed with the one or more high melting point lipids at a temperature of between about 110° F. and about 120° F. The lipid mixture can then be added to the remaining formulation components.

As previously discussed, in particular embodiments, the formulation further includes one or more additional components. For example, water or another solvent can be used to dissolve and/or mix the one or more components of the formulation. In one embodiment, the formulation comprises between about 20% and about 45% by weight water or other solvent. In another embodiment, the formulation comprises between about 25% and about 35% by weight water or other solvent.

One or more additives can also be included in the formulation. Exemplary additives include, but are not limited to, natural and/or artificial flavorings, sweeteners (e.g., sucralose, aspartame, acesulfame potassium (Ace-K), and/or rebaudioside A (Reb-A), sorbitol, etc.), coloring agents and/or color enhancing agents, preservatives, and combinations thereof.

In some embodiments, for example, the formulation includes between about 0.0% and about 1.0%, or between about 0.0% and about 0.5%, by weight of natural and/or artificial flavorings. In another embodiment, the formulation includes between about 0.1% and about 0.4% by weight of natural and/or artificial flavorings.

In certain embodiments, the formulation further includes one or more coloring agents and/or color enhancing agents. Exemplary coloring agents and/or color enhancing agents include, but are not limited to, whiteners, colorants, inks, dyes, pigments, and combinations thereof. In certain embodiments, for example, the formulation includes titanium dioxide, which can impart a white color or pigment to the formulation. In a particular embodiment, the formulation comprises between about 0.0% and about 2.0%, or between about 0.0% and about 1.0%, by weight of one or more coloring agents (and/or color enhancing agents) such as titanium dioxide. In another embodiment, the formulation comprises between about 0.5% and about 1.5% by weight of one or more coloring agents (and/or color enhancing agents) such as titanium dioxide.

In some embodiments, the formulation further includes one or more preservatives. Preservatives can be used to increase the shelf-life of the formulation and/or keep the formulation from spoiling. In particular embodiments, for example, one or more preservatives can be included to inhibit microbial growth (e.g., yeast, mold, bacteria, etc.). Exemplary preservatives include, but are not limited to, citric acid, potassium sorbate, and combinations thereof. In a particular embodiment, for example, the formulation comprises between about 0.0% and about 0.2% by weight of a first preservative such as citric acid, and between about 0.0% and about 0.1% by weight of a second preservative such as potassium sorbate. In another embodiment, the formulation comprises between about 0.0% and about 0.1% by weight of a first preservative such as citric acid, and between about 0.0% and about 0.1% by weight of a second preservative such as potassium sorbate. In yet another embodiment, the formulation comprises between about 0.05% and about 0.15%, or between about 0.05% and about 0.1%, by weight of a first preservative such as citric acid, and between about 0.05% and about 0.15%, or between about 0.05% and about 0.1%, by weight of a second preservative such as potassium sorbate. Other combinations and/or amounts of preservatives can also be used.

As can be appreciated, the above-mentioned properties and/or characteristics imparted by the various components are intended to be illustrative and exemplary and not limiting in any way. Additionally, the various components may impart additional (or fewer) properties and/or characteristics to the formulation, which may not be described herein. For example, citric acid can be included in the formulation as a preservative and for its pH buffering aspects. Further, depending on the amount of each component, and the types of components present in the formulation, a specific component can also be multi-functional and impart multiple properties and/or characteristics to the formulation.

Further, as can also be appreciated, in certain embodiments, one or more substitutes of the above-mentioned components can be included in the formulation. For example, in certain embodiments, natural substitutes of one or more of the above-mentioned components can be included if desired. For example, natural substitutes of titanium dioxide can include specialty starches (e.g., specialty rice starches), which can be used as a coloring agent. Other substitutes (natural or otherwise) that provide similar properties and/or characteristics to the above-mentioned components can also be used.

Methods of making and using edible print substrates are also disclosed herein. In certain embodiments, for example, the above-mentioned formulation, which can include one or more starches, celluloses, dextrins, sugars, humectants or plasticizers, or emulsifiers, or combinations thereof, can be mixed and formed and/or shaped into one or more edible print substrates. One or more images can thereafter be printed upon the one or more edible print substrates, and the edible print substrates can be disposed onto a foodstuff.

For the purposes of promoting an understanding of various principles of the disclosure provided herein, reference will now be made to the embodiments illustrated in the drawings and specific language will be used to describe the same. It will be readily understood with the aid of the present disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. In some cases, well-known structures, materials, or operations are not shown or described in detail. While the various aspects of the embodiments are presented in drawings, the drawings are not necessarily drawn to scale unless specifically indicated.

Figure 2:
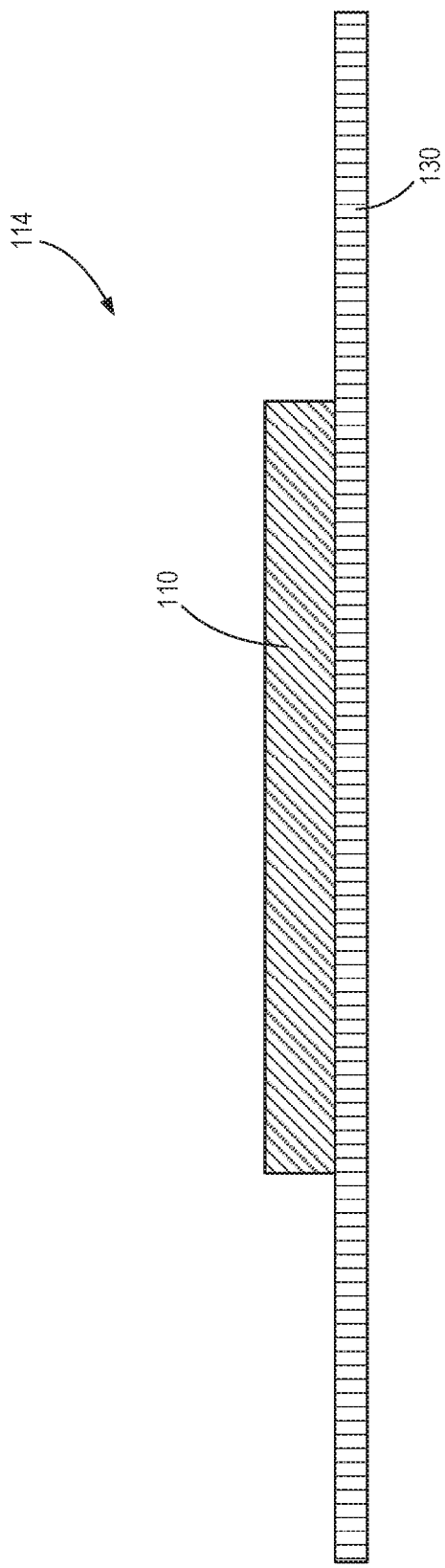
FIG. 2 is a cross-sectional view of an edible print substrate, according to another embodiment of the present disclosure.
Figure 3:
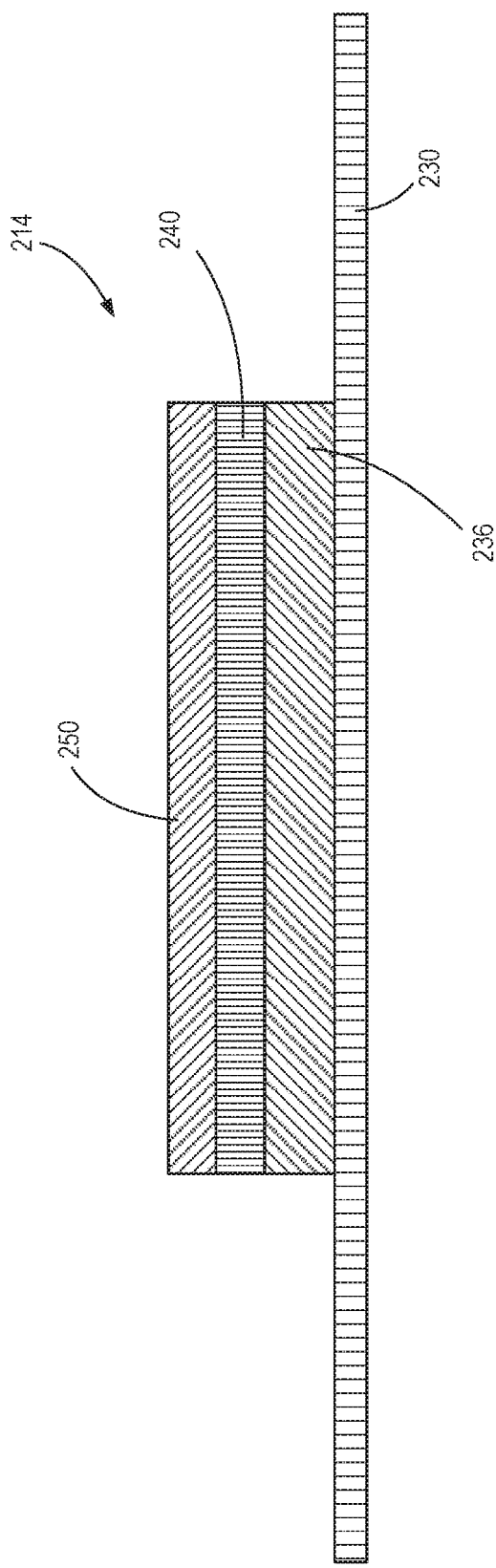
FIG. 3 is a cross-sectional view of an edible print substrate, according to another embodiment of the present disclosure.

As shown in FIG. 1, in certain embodiments, the formulations disclosed herein can be used to form an edible print substrate 14 comprising a multi-layer construction, which includes at least a base layer 36 and a print layer 50. In other embodiments, the formulations disclosed herein can be used to form an edible print substrate 114 comprising a single layer construction (such as is shown in FIG. 2). And in yet other embodiments, the formulations disclosed herein can be used to form an edible print substrate 214 comprising a multi-layer construction with 3 or more layers (such as is shown in FIG. 3).

With continued reference to FIG. 1, in some embodiments, the base and print layers 36, 50 are formulated with one or more different components (or amounts of components), such that the base and print layer 36, 50 are configured to exhibit different properties and/or characteristics. For example, the base layer 36 can be formulated to exhibit stronger (e.g., stiffer) and moisture resistant properties and/or characteristics, while the print layer 50 can be formulated to exhibit colorant-absorbent properties and/or characteristics. Thus, in some embodiments, the base layer 36 can be configured such that it does not readily absorb moisture or colorants, while the print layer 50 can be configured such that it readily absorbs colorants. In particular embodiments, the base layer 36 can be formulated to be hydrophobic.

In certain embodiments, the print layer 50 is formulated to have an absorbency that absorbs and/or inhibits smearing of food-grade colorants (also called "edible inks," "edible pigments," or "edible dyes") used to print images on the edible print substrate 14. The print layer 50 also can be formulated to be pH neutral to avoid chemical reactions between the print layer 50 and colorants that cause changes in hue and chroma of the colorants. In contrast, in certain embodiments, the base layer 36 can be configured as a barrier layer. For example, the base layer 36 can be formulated to have an absorbency that is different from the absorbency of the print layer 50 to retard or prevent migration of moisture and/or oils from the foodstuff into the print layer 50. For instance, after being disposed onto a foodstuff, which can include frosting or topping such as a buttercream or whipped frosting or topping (e.g., high whip topping), the base layer 36 can be configured to retard or prevent migration of moisture and/or oils from the frosting (or topping) and/or foodstuff into the print layer 50. Retarding the migration of moisture and/or oils can reduce diffusion of colorants within the print layer 50 and into the base layer 36 and foodstuff, which can reduce blurring of the images over time.

In various embodiments, the base layer 36 is formed by depositing a fluid base formulation onto a carrier 30 to form a thin base film that, when dried, is flexible, freestanding and removably adhered to the carrier 30. The "carrier" 30 (also called a "backing sheet," "backing paper," "release paper,"

or "carrier sheet") can be a sheet of silicone coated paper, but may also be a wax-coated paper, a resin-coated paper, a plastic sheet or tablet, a sheet of metal foil, a stone slate, or any other article having a generally smooth surface to which the base layer 36 will removably adhere. In one embodiment, the fluid base formulation may be deposited on the carrier 30 using a screen casting method in which a screen printing device is used to directly deposit the base layer 36 onto the carrier 30 in its final shape and so that it has a substantially uniform base thickness 56. Alternatively, the base formulation may be deposited by filling an opening in a stencil made of plastic, metal, or other solid material. The base formulation may also be deposited using an extrusion process, a rotary screen printing process, a web coating process (e.g., knife over roll processing or gap coating, slot coating, roll to roll coating, etc.), a 3D printing process (or three-dimensional printing process), a lamination process (e.g., laminating a layer onto a backing sheet), a spray coating process (e.g., spraying the base formulation onto a backing sheet using, e.g., an air pressure spray system), or any other method of forming thin films of fluid substances. As used herein, the term "fluid" is broadly defined to mean any substance that will flow through openings in the screen casting device or other device used for forming the fluid substance into a thin film.

In embodiments using a screen casing method, for example, a squeegee of the screen printing device can be used to fill a printing opening in a printing screen of the screen printing device, which printing opening is bordered by a mask area of the printing screen. The printing screen has a mesh count and a thread diameter that affect the resulting thickness of the layer of the formulation deposited by the screen printing device. Other factors affecting the layer thickness include the thickness of the mask area of the printing screen, the moisture content of the formulation (which affects shrinkage during drying), and properties of the squeegee of the screen printing device such as its profile, operating angle, and the amount of pressure applied to it.

After the base formulation is deposited on the carrier 30 to form the base layer 36, it is preferably dried, for example by air drying, until its moisture content is reduced to between approximately 8 percent and 10 percent by weight. The print layer 50 can then be formed over the base layer 36, which, together with the print layer 50, comprises the edible print substrate 14. The print layer 50 can be formed by depositing a coating formulation (which can also be referred to as a print layer formulation) over the base layer 36 using a screen casting method or an alternative method, such stenciling, extrusion, rotary screen printing, web coating (e.g., knife over roll, slot coating, roll to roll, etc.), 3D printing (or three-dimensional printing), lamination process (e.g., laminating onto the base layer 36), a spray coating process (e.g., spraying the coating formulation onto the base layer 36 using, e.g., an air pressure spray system), or any other method of forming a thin film over the base layer 36. It will also be appreciated that the method or process of depositing the print layer 50 (or any other layer (e.g., intermediate layer)) need not be performed using the same method or process that was used in depositing the base layer 36. For example, the base layer 36 can be deposited using a web coating process, such as a knife over roll process, and the print layer 50 can be deposited using a spray coating process, etc. When dried, the print layer 50 can permanently adhere to the base layer 36 opposite the carrier 30. The print layer 50 also can form a substantially flat, smooth, flexible outer major surface 70 of the edible print substrate 14 that is adapted to receive and carry colorants that are printed or otherwise applied to the edible print substrate 14 to form an image.

Further, the base layer 36 can be formed by depositing the base formulation in a single deposition step, or in two or more deposition steps, each followed by a drying step. Analogously, the print layer 50 (and any other layer (e.g., intermediate layer)) can be formed by depositing the coating formulation (or intermediate formulation for formation of an intermediate layer) in one or more deposition steps, followed by further drying steps.

In one embodiment, the edible print substrate 14 is dried after deposition of the coating formulation until the edible print substrate 14 has an overall moisture content of between about 7.4 percent and 8 percent by weight. However, the edible print substrate 14 may be dried to have a moisture content of between 6 and 10 percent by weight without significantly affecting the ability to print on the edible print substrate 14 or peel it from its carrier 30. Alternatively, the edible print substrate 14 may be packaged in a moist condition before drying or after partial drying, leaving the remainder of the drying to be performed by an end user of the edible print substrate 14, either before or after printing an image on the edible print substrate 14. When applied to a moist foodstuff such as a frosted cake, the finished edible print substrate 14 typically physically integrates with and/or bonds to the foodstuff, leaving the image intact.

The thickness 60 of the edible print substrate 14 can vary as desired. For example, in some embodiments, the overall thickness 60 of the edible print substrate 14 can be between about 100 microns and about 250 microns. In other embodiments, the overall thickness 60 of the edible print substrate 14 is between about 200 microns and about 250 microns. And in yet other embodiments, the overall thickness 60 of the edible print substrate 14 is between about 220 microns and about 240 microns. Greater thicknesses (e.g., thicknesses greater than about 250 microns) can also be used if desired. Edible print substrates 14 comprising a single layer construction can also have similar thicknesses. For example, a single layer construction can have a thickness of between about 100 microns to about 400 microns, between about 150 microns and about 300 microns, or between about 220 microns and about 240 microns. Single layer constructions can also have greater thicknesses if desired. For example, in certain embodiments, a single layer construction can have a thickness of between about 100 microns and about 3200 microns, or between about 100 microns and about 2500 microns.

Further, in some embodiments, the print layer 50 may be formed to have a thickness 58 that is different from the base thickness 56, for example, by depositing the respective base and print layers 36, 50 using a screen casting process having two different printing screens, i.e., first and second screens, having different mesh counts, thread diameters, and/or mask area thicknesses. Differential thickness allows the edible print substrate 14 to be made with increased strength by maximizing the base thickness 56, while minimizing the thickness of the weaker print layer 58. Differential thickness also allows the edible print substrate 14 to be manufactured so that cutability of the moisture barrier base layer 36 is maintained. Alternatively, the coating thickness 58 (or print layer thickness) and base thickness 56 (or base layer thickness) may be made substantially equal. For example, in a screen casting method, the first and second printing screens may be equal in mesh count, thread diameter, and/or mask area thickness to achieve equal base and coating thicknesses 56, 58. As previously discussed, other methods can also be used to deposit the layers 36, 50.

The following Table 1 lists possible ranges (in microns) for overall thickness 60, base thickness 56, and coating thickness 58 of the edible print substrate depicted in FIG. 1. It will, however, be appreciated that the ranges are exemplary and not meant to be exhaustive.

TABLE 1

| Overall Thickness | Base Thickness | Coating Thickness |
|---|---|---|
| 160-190 microns | 80-95 microns | 80-95 microns |
| 100-250 microns | 80-190 microns | 20-60 microns |
| 100-350 microns | 80-250 microns | 20-150 microns |
| 100-2500 microns | 80-1800 microns | 20-700 microns |

It will be appreciated that the base formulation and coating formulation, used to form the base layer 36 and print layer 50 respectively, can include any of the various components previously identified, in any of the amounts previously identified. For example, in certain embodiments, the base formulation may include citric acid in combination with another preservative (e.g., potassium sorbate), to retard spoilage of the base formulation during storage without affecting color stability of colorants applied the print layer 50. By the inclusion of citric acid, the base formulation may also be formulated to have a pH of less than 5, which can allow the base formulation to be stored at room temperature for more than 48 hours and for up to 5 days or more (e.g., up to 1 week or more) without spoiling. For example, in some embodiments, the base formulation may be formulated to have a pH of between about 4 to about 5. In other embodiments, the base formulation may be formulated to have a pH of between about 4.2 and about 4.5.

In contrast, in some embodiments, the coating formulation is devoid of citric acid. The coating formulation can also be devoid of corn syrup or corn syrup solids. Further, as noted above, the print layer 50 may be formulated to be pH neutral. For example, in certain embodiments, the print layer 50 may be formulated to have a pH of between about 6 and about 7. In other embodiments, the print layer 50 may be formulated to have a pH of between about 6.5 and about 7.5. In yet other embodiments, the print layer may be formulated to have a pH of between about 6.7 and about 6.9. The base formulation and the coating formulation can also be prepared separately and stored separately at room temperature, as necessary.

In further embodiments, the base formulation may also include a coloring agent such as titanium dioxide so that the base layer 36 forms an opaque white or solid-color background to an image printed on the print layer 50. Other coloring agents (e.g., red, orange, yellow, green, blue, purple, brown, black, etc.) can also be used to make a base formulation and/or base layer 36 having any desired color. Further, titanium dioxide and/or other coloring agents can allow the base layer 36 to remain substantially opaque, even after placement of the edible print substrate 14 on a moist foodstuff. In some of such embodiments, the coating formulation in the print layer 50 may not include titanium dioxide and/or coloring agents so that the colorants applied to the print layer 50 retain their color value and are not dulled or diluted by mixing with titanium dioxide and/or other coloring agents in the coating formulation. The absence of titanium dioxide and/or other coloring agents in the print layer 50 can also allow the base layer 36 to show through the print layer 50 and serve as a background of a printed image.

In another embodiment, one or more intermediate layers may be formed between the base layer 36 and the print layer 50 by depositing an intermediate formulation on the base layer 36 before the coating formulation is deposited. As can be appreciated, any of the above-mentioned methods and processes for depositing the base formulation and coating formulation can be used in depositing the one or more he intermediate layers. The coating formulation is then deposited over the base and intermediate layers. One or more intermediate layers may also be deposited to form laminates having 3, 4, 5 or more layers. The laminate edible print substrate 14 may be at least partly dried after deposition of each of the base 36, intermediate, and print layers 50. Intermediate layers allow the edible print substrate 14 to be built up in thickness for increased strength and improved color stability.

It is contemplated that processing of the edible print substrate 14 can be performed in whole or in part by an end user of the edible print substrate 14, or can be performed entirely by a manufacturer of the edible print substrate 14, prior to packaging and shipment to an end user. In one exemplary processing method, an edible print substrate 14 is dried until firm enough to be removed intact from the carrier 30. An edible colorant is then printed on the edible print substrate 14 to form an image. The printed edible print substrate 14 is then removed from the carrier 30 and applied to a foodstuff for presentation and consumption. If desired, the printed edible print substrate 14 can be formed into a 3-dimensional shape before presentation and consumption. In another exemplary processing method, the edible print substrate 14 is printed with an edible colorant to form an image, then dried until firm enough to be removed intact from the carrier 30. The printed, dried edible print substrate 14 is then removed from the carrier 30 and optionally formed into a 3-dimensional shape before application to a foodstuff for presentation and consumption. In yet another exemplary processing method, the edible print substrate 14 is dried and then optionally formed into a 3-dimensional shape before printing and application to a foodstuff for presentation and consumption. In still another exemplary processing method, the edible print substrate 14 is dried and a border image is printed, leaving an unprinted central area of outer major surface 70 of the edible print substrate 14. The edible print substrate 14 with border image is then packaged for shipment to an end user, who can add a personalized decoration or image to the central area by printing before applying the finished edible print substrate 14 to a foodstuff for presentation and consumption. In any of the embodiments, once the edible print substrate 14 has been at least partly dried, it can be stored at room temperature for at least 1 year in a sealed container without spoiling. Storage life can also be increased by decreasing the moisture content of the edible print substrate 14 before packaging.

FIG. 2 depicts an edible print substrate 114, according to another embodiment of the present disclosure. As shown in FIG. 2, in some embodiments, the edible print substrate 114 comprises a single layer construction 110 which can be deposited on a carrier or backing layer 130. It will be appreciated that the formulation for making the single layer construction 110 can include any of the various components previously identified, in any of the amounts previously identified. Any of the above-mentioned methods and processes for depositing the base formulation and/or coating formulation can also be used, including, but not limited to, screen casting methods or alternative methods, such stenciling, extrusion, rotary screen printing, web coating (e.g., knife over roll, slot coating, roll to roll, etc.), 3D printing (or three-dimensional printing), lamination process (e.g., laminating onto the backing layer 130), a spray coating process (e.g., spraying the formulation onto the backing layer 130 using, e.g., an air pressure spray system), or any other method of forming a thin film over the backing layer 130. The single layer construction 114 can also be printed upon and processed in a manner similar to the edible print substrate 14 discussed above with respect to FIG. 1.

As also previously discussed, the single layer construction 110 can have a variety of thicknesses, including a thickness of between about 100 microns to about 400 microns, between about 150 microns and about 300 microns, or between about 220 microns and about 240 microns. Single layer constructions 110 can also have greater thicknesses if desired. For example, in certain embodiments, a single layer construction 110 can have a thickness of between about 100 microns and about 3200 microns, or between about 100 microns and about 2500 microns.

FIG. 3 depicts an edible print substrate 214, according to yet another embodiment of the present disclosure. As shown in FIG. 3, in some embodiments, the edible print substrate 214 comprises a multi-layer construction comprising three or more layers 236, 240, 250, which can be deposited on a carrier or backing layer 230. For example, in the illustrated embodiment, the edible print substrate comprises a base layer 236, an intermediate layer 240, and a print layer 250. One or more additional intermediate layers 240 can also be included if desired.

As can be appreciated, the characteristics and/or properties of the base layer 236 and print layer 250 can be similar to those described above with respect to the base layer 36 and print layer 50 of FIG. 1. It will also be appreciated that the base formulation and coating formulation, used to form the base layer 236 and print layer 250 respectively, can include any of the various components previously identified, in any of the amounts previously identified. Similarly, the intermediate formulation used to form the intermediate layer 240 can also include any of the various components previously identified, in any of the amounts previously identified.

In certain embodiments, the one or more intermediate layers 240 can be used to provide additional protection against the migration of moisture and/or oils from the foodstuff through the edible print substrate 214 and into the print layer 250. For example, the one or more intermediate layers 240 can serve as barrier layers between the foodstuff and the print layer 250. While not limited to such uses, an edible print substrate 214 comprising one or more intermediate layers 240 can be advantageous when disposed on a high moisture containing foodstuff. In some of such embodiments, the intermediate formulation used to form the intermediate layer can include one or more low melting point lipids (e.g., palm oil shortening, coconut oil, canola oil, etc.) and one or more high melting point lipids (e.g., calcium stearate) in addition to various other components identified above.

The following Table 2 lists possible ranges (in microns) for overall thickness, base layer thickness, intermediate layer thickness, and print layer thickness of the edible print substrate 214 depicted in FIG. 3. It will, however, be appreciated that the ranges are exemplary and not meant to be exhaustive.

TABLE 2

| Overall Thickness | Base Layer Thickness | Intermediate Layer Thickness | Print Layer Thickness |
|---|---|---|---|
| 240-285 microns | 80-95 microns | 80-95 microns | 80-95 microns |
| 120-310 microns | 80-190 microns | 20-60 microns | 20-60 microns |
| 120-550 microns | 80-250 microns | 20-150 microns | 20-150 microns |
| 120-3200 microns | 80-1800 microns | 20-700 microns | 20-700 microns |

It will also be appreciated that any of the above-mentioned methods and processes for depositing the base formulation and/or coating formulation can also be used for depositing the intermediate formulation, including, but not limited to, screen casting methods or alternative methods, such stenciling, extrusion, rotary screen printing, web coating (e.g., knife over roll, slot coating, roll to roll, etc.), 3D printing (or three-dimensional printing), lamination process (e.g., laminating onto the base layer 236), a spray coating process (e.g., spraying the formulation onto the base layer 236 using, e.g., an air pressure spray system), or any other method of forming a thin film over the base layer 236.

Non-limiting examples of various formulations and/or edible print substrates disclosed herein are presented in the examples below:

Example 1

The following is a prophetic example of forming a single layer edible print substrate using the following ingredients:

| Ingredient | Amount (wt %) |
|---|---|
| 1. Water | 25-35% |
| 2. Tapioca Starch | 22-30% |
| 3. Maltodextrin having a DE of between 5-15 | 14-20% |
| 4. Glycerine | 8-12% |
| 5. Sugar | 4-8% |
| 6. Microcrystalline Cellulose | 4-8% |
| 7. Cellulose Gum | 3-5% |
| 8. Modified Corn Starch | 0-2% |
| 9. Titanium Dioxide | 0-2% |
| 10. Polyglycerol Esters of Fatty Acids | 0.4-0.8% |
| 11. Natural and Artificial Flavors | 0.1-0.4% |
| 12. Citric Acid | 0-0.1% |
| 13. Potassium Sorbate | 0-0.1% |

The tapioca starch, maltodextrin, sugar, microcrystalline cellulose, cellulose gum, titanium dioxide, and natural and artificial flavors are blended or otherwise mixed to achieve a substantially homogeneous mixture. The water, glycerine, modified corn starch, polyglycerol esters of fatty acids, citric acid, and potassium sorbate are then added and blended with the mixture, yielding a formulation for the edible print substrate.

A sufficient amount of the formulation is then disposed on a carrier to achieve a desired thickness (e.g., a thickness of between about 220 and about 240 microns). The formulation can then be dried, or at least partially dried, yielding an edible print substrate that can be printed upon or packaged for printing at a later time.

Example 2

Several multi-layer edible print substrates were made using the following base formulations and coating formulations:

Each base formulation included ingredients within the following ranges:

| Ingredient | Amount (wt %) |
| --- | --- |
| 1. Water | 25-35% |
| 2. Tapioca Starch | 22-30% |
| 3. Maltodextrin having a DE of between 5-15 | 14-20% |
| 4. Glycerine | 8-12% |
| 5. Sugar | 4-8% |
| 6. Microcrystalline Cellulose | 4-8% |
| 7. Cellulose Gum | 3-5% |
| 8. Modified Corn Starch | 0-2% |
| 9. Titanium Dioxide | 0.5-1.5% |
| 10. Polyglycerol Esters of Fatty Acids | 0.4-0.8% |
| 11. Natural and Artificial Flavors | 0.1-0.4% |
| 12. Citric Acid | 0.05-0.15% |
| 13. Potassium Sorbate | 0.05-0.1% |

The tapioca starch, maltodextrin, sugar, microcrystalline cellulose, cellulose gum, titanium dioxide, and natural and artificial flavors were blended to achieve a substantially homogeneous mixture. The water, glycerine, modified corn starch, polyglycerol esters of fatty acids, citric acid, and potassium sorbate were then added and blended with the mixture, yielding each base formulation.

An amount of each base formulation was then disposed on a carrier to achieve a base layer having a thickness of between about 80 microns and about 100 microns. The base layer was then at least partially dried. A coating formulation, described below, was then disposed onto a surface of each base layer to yield a multi-layer edible print substrate.

Each coating formulation included ingredients within the following ranges:

| Ingredient | Amount (wt %) |
| --- | --- |
| 1. Water | 25-35% |
| 2. Tapioca Starch | 22-30% |
| 3. Maltodextrin having a DE of between 5-15 | 14-20% |
| 4. Glycerine | 8-12% |
| 5. Sugar | 4-8% |
| 6. Microcrystalline Cellulose | 4-8% |
| 7. Cellulose Gum | 3-5% |
| 8. Modified Corn Starch | 0-2% |
| 9. Polyglycerol Esters of Fatty Acids | 0.4-0.8% |
| 10. Natural and Artificial Flavors | 0.1-0.4% |
| 11. Potassium Sorbate | 0.05-0.1% |

The tapioca starch, maltodextrin, sugar, microcrystalline cellulose, cellulose gum, and natural and artificial flavors were blended to achieve a substantially homogeneous mixture. The water, glycerine, modified corn starch, polyglycerol esters of fatty acids, and potassium sorbate were then added and blended with the mixture, yielding each coating formulation.

An amount of each coating formulation was then disposed onto a surface of each base layer to achieve a print layer having a thickness of between about 120 microns and about 140 microns. Each resulting edible print substrate had an overall thickness of between about 200 microns and about 240 microns, and could be printed upon, or packaged and printed upon at a later date.

Example 3

Samples of multi-layer edible print substrates (Samples 1A-1B) having an overall thickness of between about 220 microns and about 240 microns were made in accordance with Example 2 and compared with samples of a commercially available product (Comparative Samples 2A-2B). The comparative samples (Comparative Samples 2A-2B) had a thickness of between about 400 microns and about 500 microns, and included a mixture of water, tapioca starch, corn syrup, corn syrup solids, cellulose, sorbitol, glycerine, sugar, canola oil, arabic gum, polysorbate 80, vanilla, titanium dioxide, and citric acid.

Identical images were applied to each of Samples 1A-1B and Comparative Samples 2A-2B. Sample 1A and Comparative Sample 2A were then applied on a cake covered with buttercream frosting, after which the cake was placed in a freezer for two days. The cake was then removed from the freezer and left at room temperature under fluorescent light for evaluation at various time intervals (e.g., 2 hours, 8 hours, 24 hours, and 48 hours, etc.). At each evaluation period, the image disposed on Sample 1A exhibited decreased fading and/or decreased bleeding as compared to the images disposed on Comparative Sample 2A.

Sample 1B and Comparative Sample 2B were applied to a cake covered in a whipped topping. The cake was then left at room temperature under fluorescent light for evaluation at various time intervals (e.g., 2 hours, 4 hours, and 8 hours, etc.). At each evaluation period, the image disposed on Sample 1B exhibited decreased fading and/or decreased bleeding as compared to the images disposed on Comparative Sample 2B. The edible print substrates disclosed herein thus exhibit a superior ability to maintain image quality as compared to another commercially available product.

Example 4

Several multi-layer edible print substrates were made using the following base formulations, intermediate formulations, and coating formulations:

Each base formulation included ingredients within the following ranges:

| Ingredient | Amount (wt %) |
| --- | --- |
| 1. Water | 25-35% |
| 2. Tapioca Starch | 22-30% |
| 3. Maltodextrin having a DE of between 5-15 | 14-20% |
| 4. Glycerine | 8-12% |
| 5. Sugar | 4-8% |
| 6. Microcrystalline Cellulose | 4-8% |
| 7. Cellulose Gum | 3-5% |
| 8. Modified Corn Starch | 0-2% |
| 9. Titanium Dioxide | 0.5-1.5% |
| 10. Polyglycerol Esters of Fatty Acids | 0.4-0.8% |
| 11. Natural and Artificial Flavors | 0.1-0.4% |
| 12. Citric Acid | 0.05-0.15% |
| 13. Potassium Sorbate | 0.05-0.1% |

The tapioca starch, maltodextrin, sugar, microcrystalline cellulose, cellulose gum, titanium dioxide, and natural and artificial flavors were blended to achieve a substantially homogeneous mixture. The water, glycerine, modified corn starch, polyglycerol esters of fatty acids, citric acid, and potassium sorbate were then added and blended with the mixture, yielding each base formulation.

An amount of each base formulation was then disposed on a carrier to achieve a base layer having a thickness of between about 120 microns and about 140 microns. The base layer was then at least partially dried. An intermediate formulation, described below, was then disposed onto a surface of each base layer prior to disposing the coating formulation.

Each intermediate formulation included ingredients within the following ranges:

| Ingredient | Amount (wt %) |
| --- | --- |
| 1. Water | 25-35% |
| 2. Tapioca Starch | 22-30% |
| 3. Maltodextrin having a DE of between 5-15 | 14-20% |
| 4. Shortening (Palm Oil) | 5-10% |
| 5. Coconut Oil | 5-10% |
| 6. Sugar | 4-8% |
| 7. Microcrystalline Cellulose | 4-8% |
| 8. Cellulose Gum | 2-6% |
| 9. Glycerine | 2-6% |
| 10. Calcium Stearate | 2-6% |
| 11. Modified Corn Starch | 0-4% |
| 12. Sorbitol | 0-4% |
| 13. Polyglycerol Esters of Fatty Acids | 0.4-0.8% |
| 14. Titanium Dioxide | 0.5-1.5% |
| 15. Natural and Artificial Flavors | 0.1-0.4% |
| 16. Potassium Sorbate | 0.05-0.1% |
| 17. Citric Acid | 0.05-0.1% |

The tapioca starch, maltodextrin, sugar, microcrystalline cellulose, cellulose gum, titanium dioxide, and natural and artificial flavors were blended to achieve a substantially homogeneous mixture. The water, glycerine, modified corn starch, polyglycerol esters of fatty acids, citric acid, and potassium sorbate were then added and blended with the mixture. The shortening (palm oil) and coconut oil were then melted and mixed with the calcium stearate at about 110° F. to about 120° F. The starch containing mixture was then heated to about 110° F. and the oil containing mixture was added to it, yielding each intermediate formulation.

An amount of each intermediate formulation was then disposed on the base layer to achieve an intermediate layer having a thickness of between about 120 microns and about 140 microns. The intermediate layer was then at least partially dried. A coating formulation, described below, was then disposed onto a surface of each intermediate layer to yield a multi-layer edible print substrate.

Each coating formulation included ingredients within the following ranges:

| Ingredient | Amount (wt %) |
| --- | --- |
| 1. Water | 25-35% |
| 2. Tapioca Starch | 22-30% |
| 3. Maltodextrin having a DE of between 5-15 | 14-20% |
| 4. Glycerine | 8-12% |
| 5. Sugar | 4-8% |
| 6. Microcrystalline Cellulose | 4-8% |
| 7. Cellulose Gum | 3-5% |
| 8. Modified Corn Starch | 0-2% |
| 9. Polyglycerol Esters of Fatty Acids | 0.4-0.8% |
| 10. Natural and Artificial Flavors | 0.1-0.4% |
| 11. Potassium Sorbate | 0.05-0.1% |

The tapioca starch, maltodextrin, sugar, microcrystalline cellulose, cellulose gum, and natural and artificial flavors were blended to achieve a substantially homogeneous mixture. The water, glycerine, modified corn starch, polyglycerol esters of fatty acids, and potassium sorbate were then added and blended with the mixture, yielding each coating formulation.

An amount of each coating formulation was then disposed onto a surface of each intermediate layer to achieve a print layer having a thickness of between about 120 microns and about 140 microns. Each resulting edible print substrate had an overall thickness of between about 360 microns and about 420 microns, and could be printed upon, or packaged and printed upon at a later date.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims and their equivalents.

What is claimed is:

1. An edible print substrate, comprising:
   a base layer comprising a base formulation, the base formulation comprising
      between 15% and 40% by weight of one or more starches,
      between 3% and 20% by weight of one or more celluloses,
      between 10% and 24% weight of a dextrin and/or a maltodextrin having a DE of between 5 and 15,
      between 10% and 30% by weight of one or more low melting point lipids, the one or more low melting point lipids each having a melting point of 95° F. or lower, and
      between 1% and 8% by weight of one or more high melting point lipids, the one or more high melting point lipids each having a melting point of 158° F. or higher; and
   a print layer comprising a coating formulation, the coating formulation comprising
      between 15% and 40% by weight of one or more starches,
      between 3% and 20% by weight of one or more celluloses, and
      one or more of a corn syrup, corn syrup solids, a sweetener, or a sugar;
   wherein the base layer is less absorbent to moisture and colorants than the print layer.

2. The edible print substrate of claim 1, wherein the one or more starches of the base formulation comprises at least one of a tapioca starch, a corn starch, a wheat starch, a rice starch, a potato starch, or a derivative thereof.

3. The edible print substrate of claim 1, wherein the one or more celluloses of the base formulation comprises at least one of a microcrystalline cellulose or a carboxymethyl cellulose.

4. The edible print substrate of claim 1, wherein the base formulation further comprises an emulsifier.

5. The edible print substrate of claim 1, wherein a thickness of the edible print substrate is between 100 microns and 250 microns.

6. The edible print substrate of claim 1, wherein the base formulation further comprises a coloring agent.

7. The edible print substrate of claim 1, wherein the base formulation further comprises a preservative.

8. The edible print substrate of claim 1, wherein a pH of the base layer is between 4 and 5, and a pH of the print layer is between 6.5 and 7.5.

9. The edible print substrate of claim 1, wherein the base formulation comprises between 14% and 20% by weight of the dextrin and/or maltodextrin.

10. The edible print substrate of claim 1, further comprising:
    an intermediate layer comprising an intermediate formulation, the intermediate formulation comprising
        a starch,
        a cellulose,
        a low melting point lipid, the low melting point lipid having a melting point of 95° F. or lower,
        a high melting point lipid, the high melting point lipid having a melting point of 158° F. or higher,
        a dextrin and/or a maltodextrin having a DE of between 5 and 15, and
        a humectant or plasticizer.

11. The edible print substrate of claim 1, wherein the one or more low melting point lipids of the base formulation comprises at least one of a shortening or a coconut oil.

12. The edible print substrate of claim 1, wherein the one or more high melting point lipids of the base formulation comprises calcium stearate.

13. A method of forming a multi-layer edible print substrate, comprising:
    depositing a base formulation onto a carrier to form a base layer, wherein the base formulation comprises
        between 15% and 40% by weight of one or more starches,
        between 3% and 20% by weight of one or more celluloses,
        between 10% and 24% by weight of a dextrin and/or a maltodextrin having a DE of between 5 and 15,
        between 10% and 30% by weight of one or more low melting point lipids, the one or more low melting point lipids each having a melting point of 95° F. or lower,
        between 1% and 8% by weight of one or more high melting point lipids, the one or more high melting point lipids each having a melting point of 158° F. or higher, and
        a humectant or plasticizer; and
    depositing a coating formulation to form a print layer, wherein the coating formulation comprises
        between 15% and 40% by weight of one or more starches,
        between 3% and 20% by weight of one or more celluloses,
        one or more of a corn syrup, corn syrup solids, a sweetener, or a sugar, and
        a humectant or plasticizer;
    wherein the base layer is less absorbent to moisture and colorants than the print layer.

14. The method of claim 13, further comprising depositing an intermediate formulation to form an intermediate layer wherein the intermediate formulation comprises:
    a starch;
    a cellulose;
    a low melting point lipid, the low melting point lipid having a melting point of 95° F. or lower;
    a high melting point lipid, the high melting point lipid having a melting point of 158° F. or higher;
    a dextrin and/or a maltodextrin having a DE of between 5 and 20; and
    a humectant or plasticizer.

* * * * *